United States Patent
Gordan et al.

(10) Patent No.: US 11,019,844 B1
(45) Date of Patent: Jun. 1, 2021

(54) SMOKING PIPE

(71) Applicants: Zachary Gordan, Redondo Beach, CA (US); Chad Dime, Rancho Palos Verdes, CA (US)

(72) Inventors: Zachary Gordan, Redondo Beach, CA (US); Chad Dime, Rancho Palos Verdes, CA (US)

( * ) Notice: Subject to any disclaimer, the term of this patent is extended or adjusted under 35 U.S.C. 154(b) by 0 days.

(21) Appl. No.: 15/004,929

(22) Filed: Jan. 23, 2016

Related U.S. Application Data

(60) Provisional application No. 62/107,123, filed on Jan. 23, 2015, provisional application No. 62/281,959, filed on Jan. 22, 2016.

(51) Int. Cl.
| | | |
|---|---|---|
| *A24F 3/00* | (2006.01) | |
| *A24F 5/00* | (2006.01) | |
| *A24F 5/08* | (2006.01) | |
| *A24F 5/10* | (2006.01) | |
| *A24F 1/28* | (2006.01) | |
| *G02C 5/14* | (2006.01) | |
| *G02C 5/00* | (2006.01) | |
| *G02C 11/02* | (2006.01) | |
| *G02C 9/04* | (2006.01) | |

(52) U.S. Cl.
CPC ............ *A24F 3/00* (2013.01); *A24F 5/08* (2013.01); *A24F 5/10* (2013.01); *G02C 5/143* (2013.01); *A24F 1/28* (2013.01); *A24F 5/00* (2013.01); *G02C 5/001* (2013.01); *G02C 9/04* (2013.01); *G02C 11/02* (2013.01)

(58) Field of Classification Search
CPC ...... A24F 3/00; A24F 1/00; A24F 1/28; A24F 1/06; A24F 1/04; A24F 1/02; A24F 2700/01; A24F 2700/00; A24F 5/10; A24F 5/00; A24F 5/08; G02C 5/143; G02C 5/14; G02C 5/008; G02C 5/001; G02C 5/146; G02C 9/02; G02C 9/04; G02C 11/02; G02C 11/00
See application file for complete search history.

(56) References Cited

U.S. PATENT DOCUMENTS

| | | | | |
|---|---|---|---|---|
| 3,415,596 A | * | 12/1968 | Carmichael | G01V 1/145 2/446 |
| 3,663,099 A | * | 5/1972 | Saffir | A45C 11/005 206/5 |
| 4,996,983 A | * | 3/1991 | AmRhein | A62B 18/00 128/205.29 |

(Continued)

FOREIGN PATENT DOCUMENTS

KR    2003094968 A   * 12/2003 ............. B01D 39/16

*Primary Examiner* — Alex B Efta
(74) *Attorney, Agent, or Firm* — Steven E. Shapiro

(57) ABSTRACT

The present invention is a smoking pipe that also serves as a pair of eyeglasses, which can either include prescription lenses and/or tinted lenses. In the present invention, at least one temple comprises a pipe that can be used to smoke tobacco or other smoking material. The temple will generally include a bowl that is accessible from the outside wall of the temple, a smoke way that extends through the temple, and a smoke hole at the end of the temple. The user can place the smoking material in the bowl, light the material, and then inhale the smoke (which travels through the smoke way) through the smoke hole. The present invention can also be an electronic cigarette or incorporate a vaporizer.

1 Claim, 9 Drawing Sheets

(56) References Cited

U.S. PATENT DOCUMENTS

| | | | | |
|---|---|---|---|---|
| 5,539,480 A | * | 7/1996 | Rakoff | G02C 11/00 |
| | | | | 351/121 |
| 5,690,101 A | * | 11/1997 | Kutta | A62B 19/00 |
| | | | | 128/202.26 |
| 2007/0046890 A1 | * | 3/2007 | Chen | G02C 11/00 |
| | | | | 351/120 |
| 2010/0315586 A1 | * | 12/2010 | Mansuy | G02C 5/008 |
| | | | | 351/52 |

* cited by examiner

SMOKING PIPE

CROSS-REFERENCE TO RELATED APPLICATIONS

This application claims benefit from U.S. Provisional Patent Application, Ser. No. 62/107,123, which was filed on Jan. 23, 2015. The specification of said provisional patent application is incorporated herein by this reference as though set forth in full.

This application claims benefit from U.S. Provisional Patent Application, Ser. No. 62/281,959, which was filed on Jan. 22, 2016. The specification of said provisional patent application is incorporated herein by this reference as though set forth in full.

STATEMENT REGARDING FEDERALLY SPONSORED RESEARCH OR DEVELOPMENT

Not Applicable

FIELD OF INVENTION

The present invention relates devices for smoking tobacco or other smoking materials.

BACKGROUND OF THE INVENTION

Many people enjoy smoking a pipe. However, sometimes carrying a smoking pipe is inconvenient or is not permitted. Therefore, the present invention is a smoking pipe that is easy to carry and is convenient for the user.

SUMMARY OF THE INVENTION

The present invention is a smoking pipe. It also serves as a pair of eyeglasses, which can either include prescription lenses and/or tinted lenses. In the present invention, at least one temple comprises a pipe that can be used to smoke tobacco or other smoking material. The temple will generally include a bowl that is accessible from the outside wall of the temple, a smoke way that extends through the temple, and a smoke hole at the end of the temple. The user can place the smoking material in the bowl, light the material, and then inhale the smoke through the smoke hole. In the preferred embodiment, the opposite temple will have a chamber with a removable cover for storing smoking material. The present invention might also include a chamber for storing matches and a swatch of sand paper or like material on the inside surface of one of the temples to light a match. The sand paper might be located on the cover of the storage compartment.

BRIEF DESCRIPTION OF THE DRAWINGS

The above and other objects and advantages of the present invention will be apparent upon consideration of the following detailed description, taken in conjunction with the accompanying drawings and in which.

DETAILED DESCRIPTION OF THE INVENTION

Figure 1:
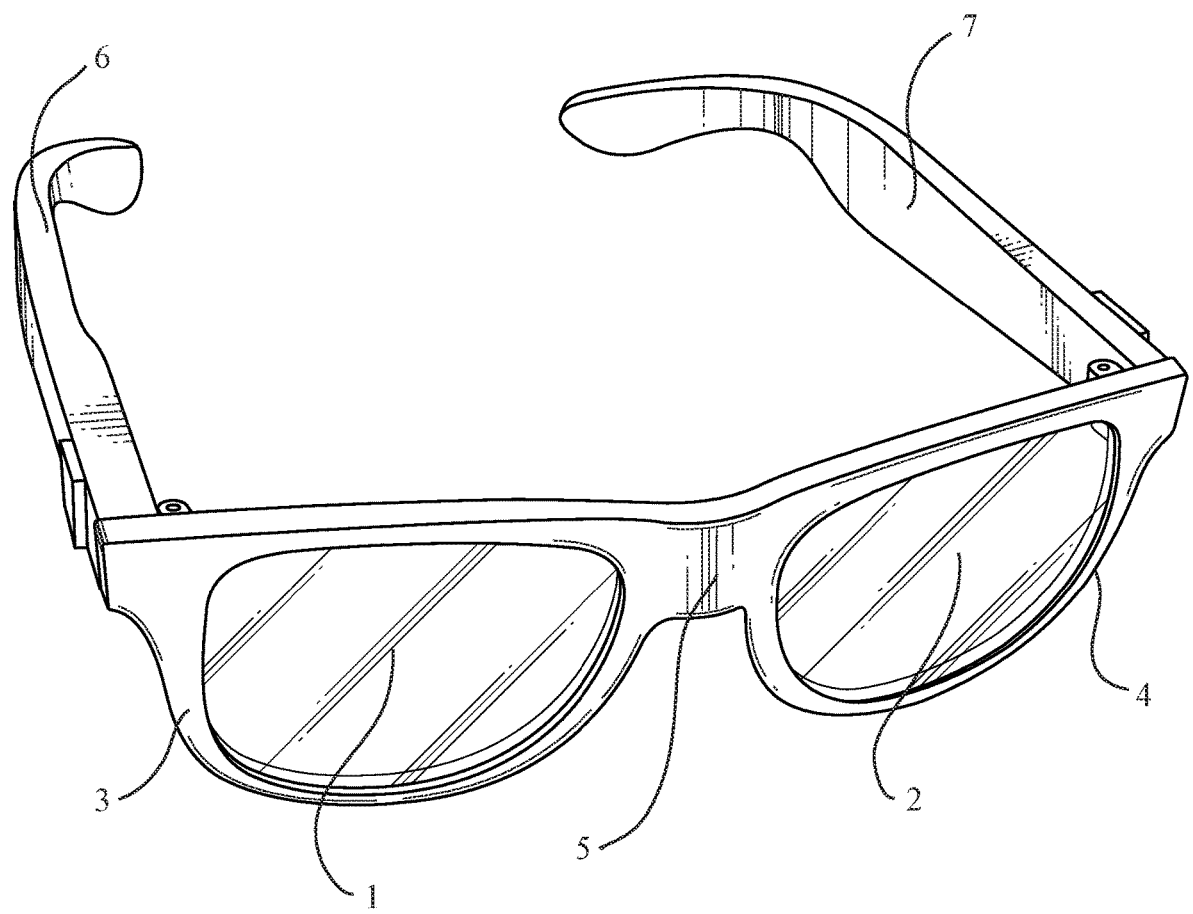
FIG. 1 is a front top view of the present invention.

As can be seen in FIG. 1, the present invention comprises what is commonly called "eyeglasses". The present invention, in the embodiment shown in FIG. 1, comprises a right lens 1, a left lens 2, a right rim 3, a left rim 4, a bridge 5, a right temple 6 and a left temple 7. The right lens 1 and left lens 2 are transparent such that the user can see through the lenses when the eyeglasses are placed on his or her face. The lenses can be refractive and/or tinted. The lenses are generally made of a hard material such as glass, plastic, polycarbonate, trivex, hard resin or other similar material well known to those of skill in the art.

The left rim 4 holds the left lens 2 in place and the right rim 3 holds the right lens 1 in place. The bridge 5 connects that left rim 4 and the right rim 3 and is placed over the user's nose when the present invention is in use as eyeglasses. The right temple 6 is hingedly connected to the right rim 3 and the left temple 7 is hingedly connected to the left rim 4. The ends of the temples are generally curved downward and inward in order to better fit over the ears of the user.

In the preferred embodiment, the left rim, right rim and bridge are formed as a single piece of plastic, although these parts can be made as individual pieces that are connected together in some manner generally known to those of skill in the art. The rims and/or bridge can also be made from other material such as metals or composites. In the preferred embodiment, the temples comprise hard, dense-grained wood such as cherry, olive, maple, mesquite, oak, and bog-wood. A wood composite might also be used, as well as a wood laminate. The temples can also comprise a hard plastic, mineral composite or other material.

Figure 2:
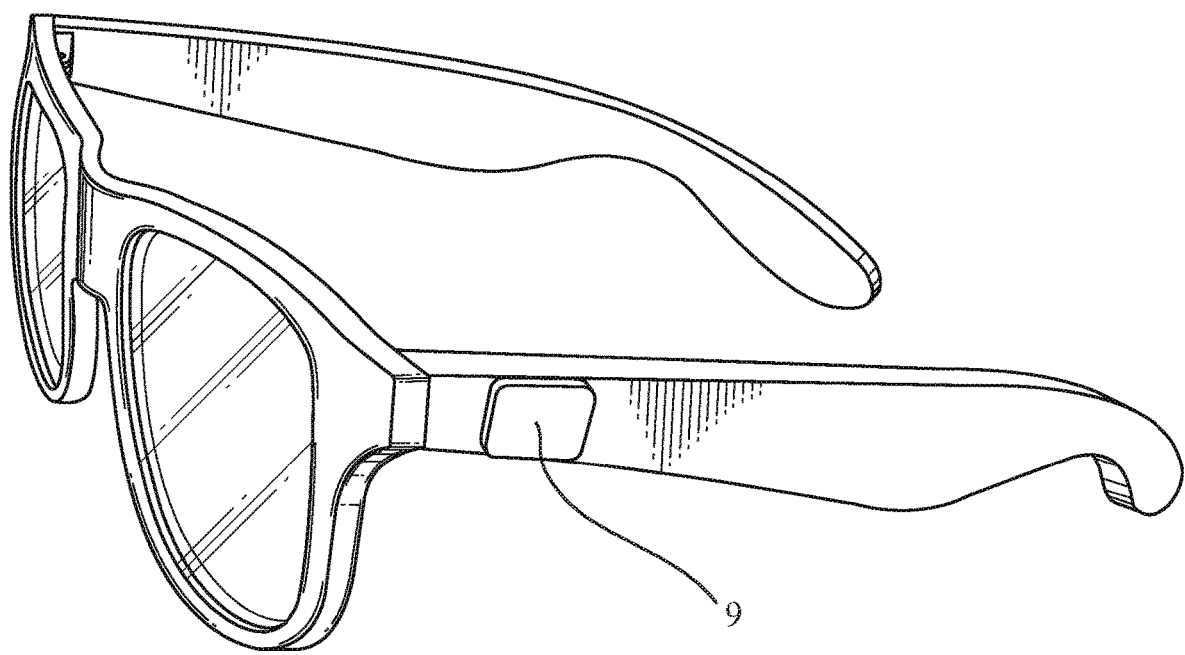
FIG. 2 is a left side view of the present invention.
Figure 3:
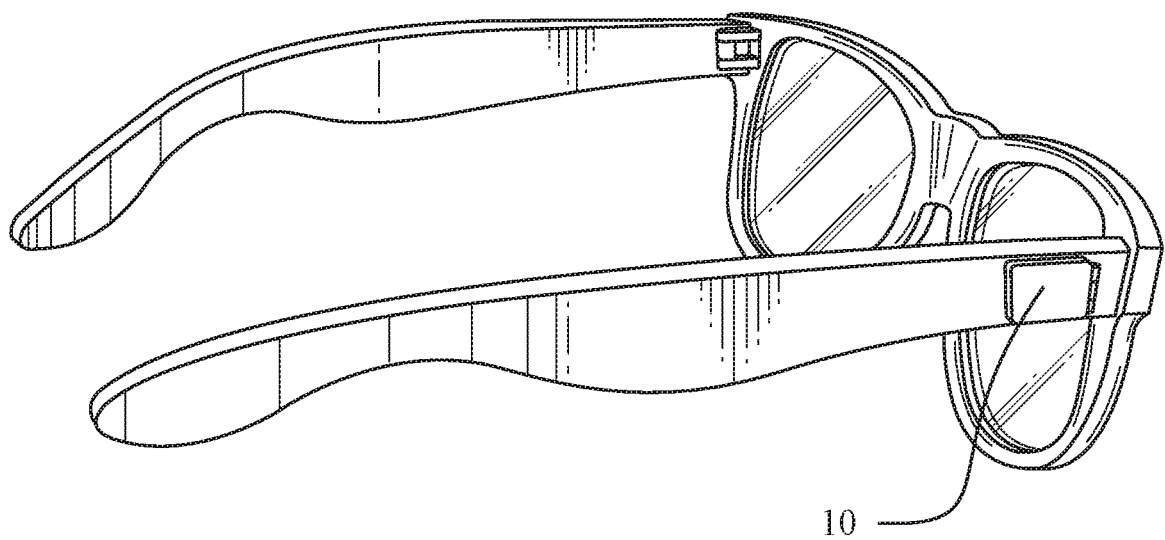
FIG. 3 is a right side view of the present invention.

FIG. 2 is a left side view of the present invention. It shows a decorative element 9 on the outside wall of the left temple. FIG. 3 is a right side view of the present invention. It has a closed bowl cover 10, which matches decorative element 9 in appearance.

Figure 4:
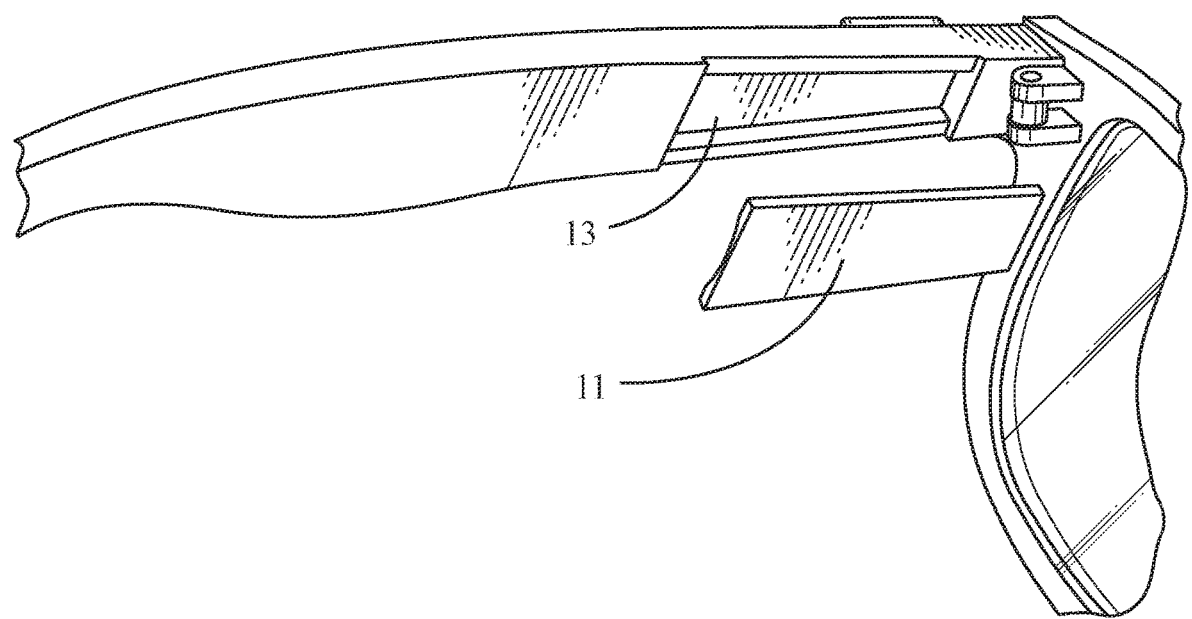
FIG. 4 shows a storage compartment in a temple.

As seen in FIG. 4, in the embodiment described herein, the inside wall of the left temple has a storage chamber 13 formed therein for storing smoking material (such as tobacco). Preferably, the storage chamber 13 has a removable cover 11. The removable cover can be a plug, hingedly connected to the left temple, a slideable cover, a cover that swivels around a pin, or otherwise.

Figure 5:
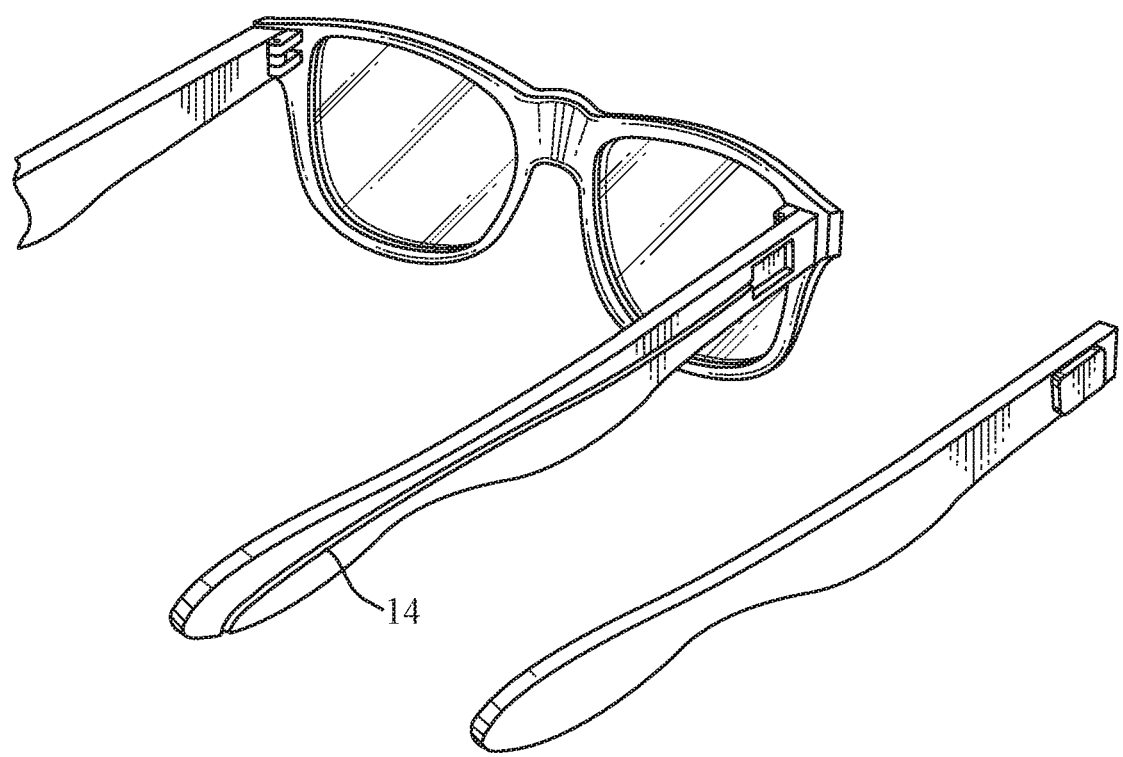
FIG. 5 is a cross-section showing the smoke way.

As seen in FIG. 5, in the preferred embodiment, the right temple has a smoke way 14 that passes therethrough. The smoke way comprises a tunnel inside the right temple that will generally be of a consistent diameter throughout. The diameter will generally be the diameter typically found in standard smoking pipes. Typically, the diameter of the tunnel will be at least two millimeters.

Figure 6:
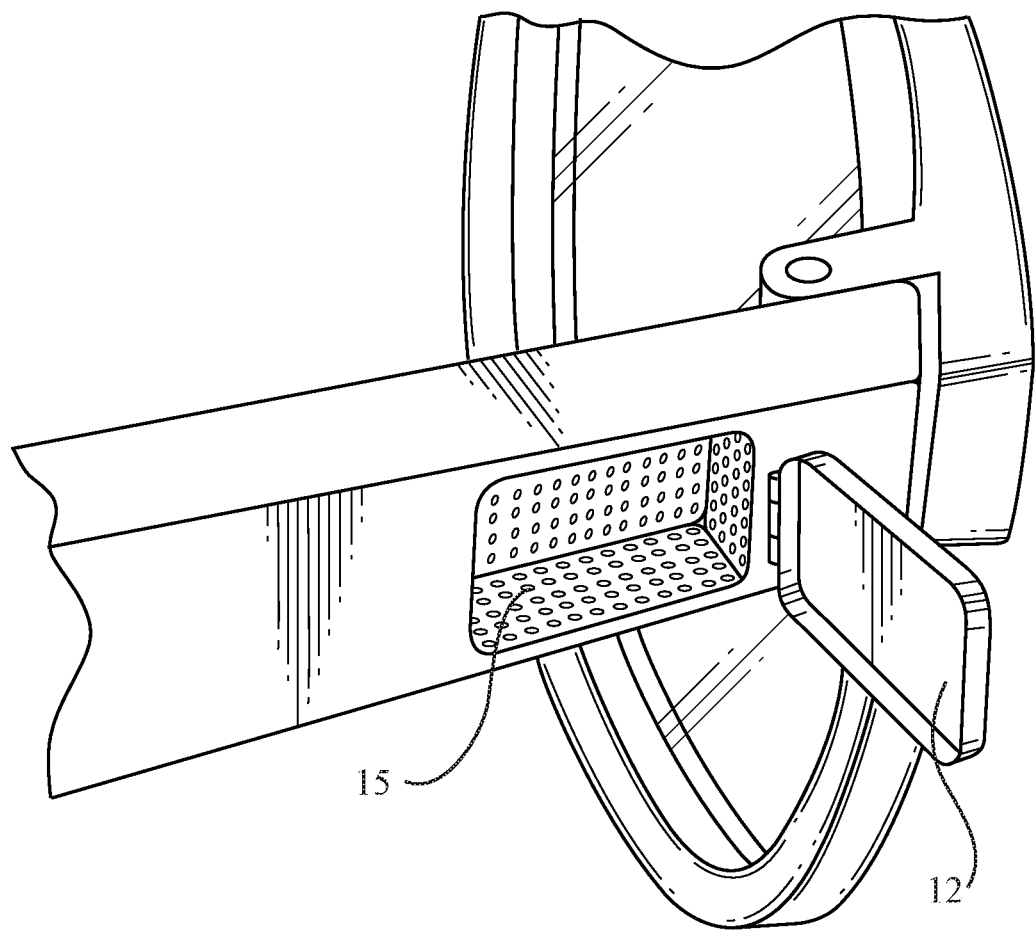
FIG. 6 shows the bowl with the bowl cover opened.
Figure 7:
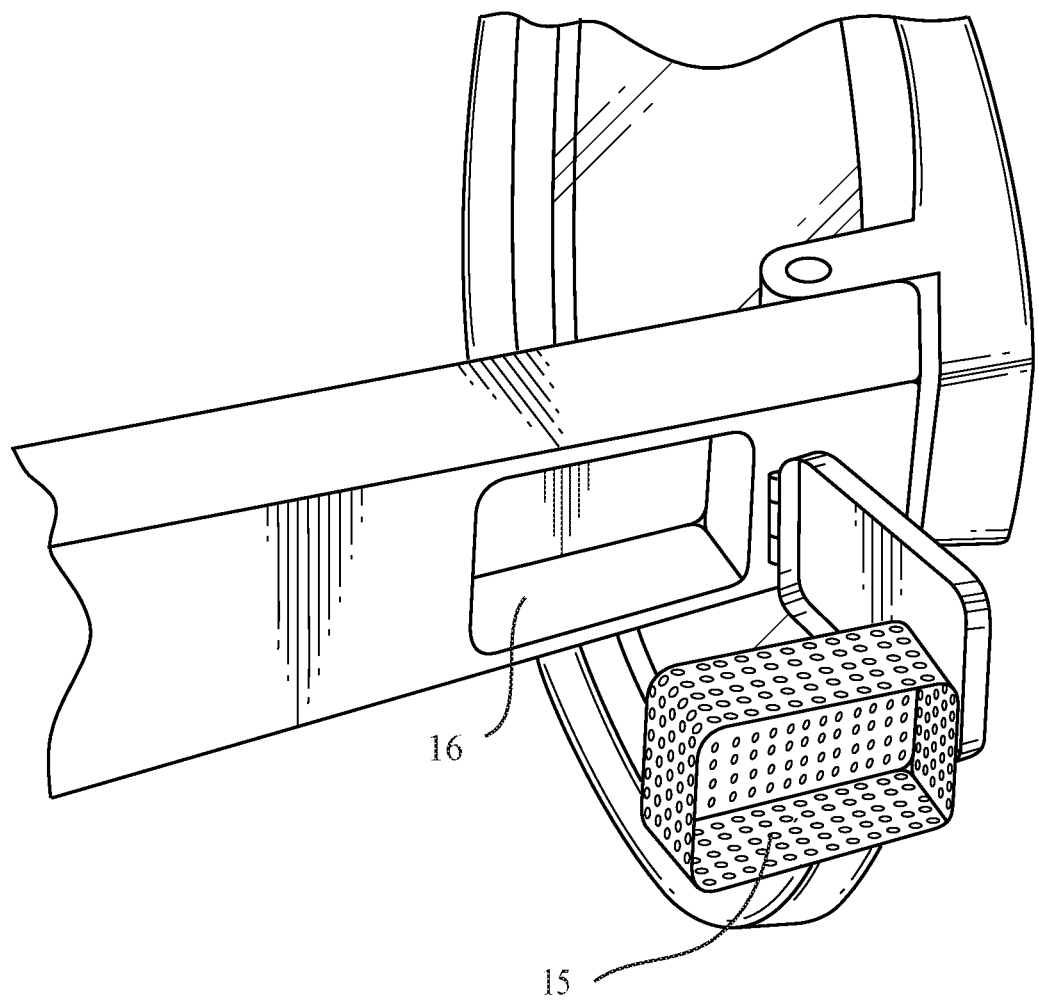
FIG. 7 shows the screen that fits within the bowl.

As seen in FIG. 6, in the preferred embodiment, the smoke way is connected to a bowl. The bowl is located near the hinge of the right temple and opens on the outside wall of the right temple. Smoking material can be placed within this bowl when the bowl is open for smoking. Preferably, the bowl has a removable cover 12. When the cover is closed, as mentioned above, the outside of the cover will look like the decorative element on the outer wall of the other temple. Generally, there is also a metal screen 15 that fits within the bowl such that the smoking material is placed inside the screen for smoking. The preferred screen is additionally depicted in FIG. 7. In FIG. 7, the screen 15 has been removed from the bowl 16.

Figure 8:
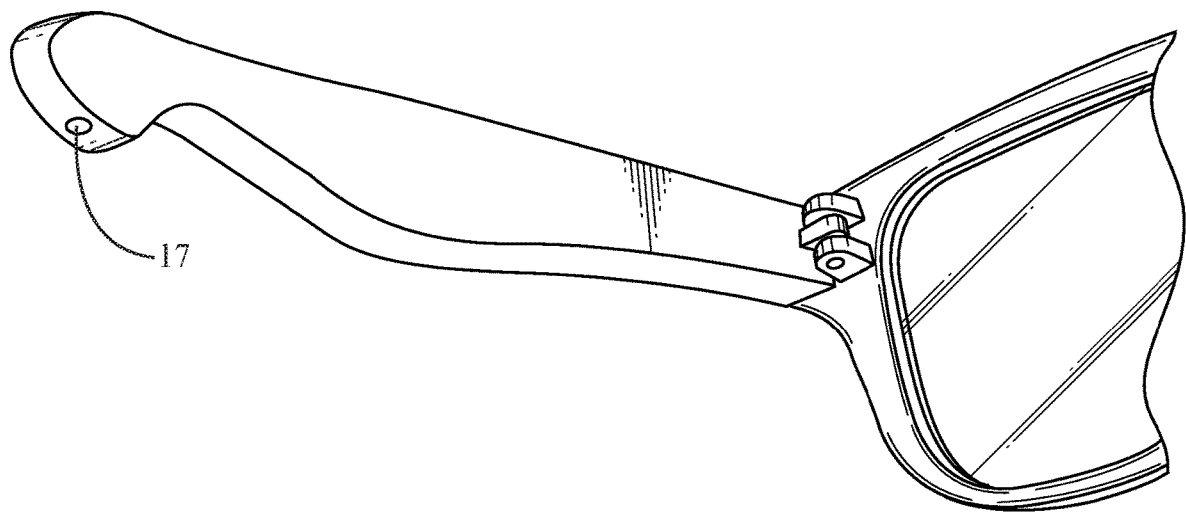
FIG. 8 shows the smoke hole at the end of the temple that comprises the pipe.

On the other end of the temple, the smoke way leads to a smoke hole. Such a smoke hole 17 is depicted in FIG. 8, although in the embodiment shown in FIG. 8, the left temple is a pipe (as opposed to the right temple). When the smoking material is lit, the user can suck smoke through the smoke hole 17, as the smoke travels from the bowl through the smoke way.

Figure 9:
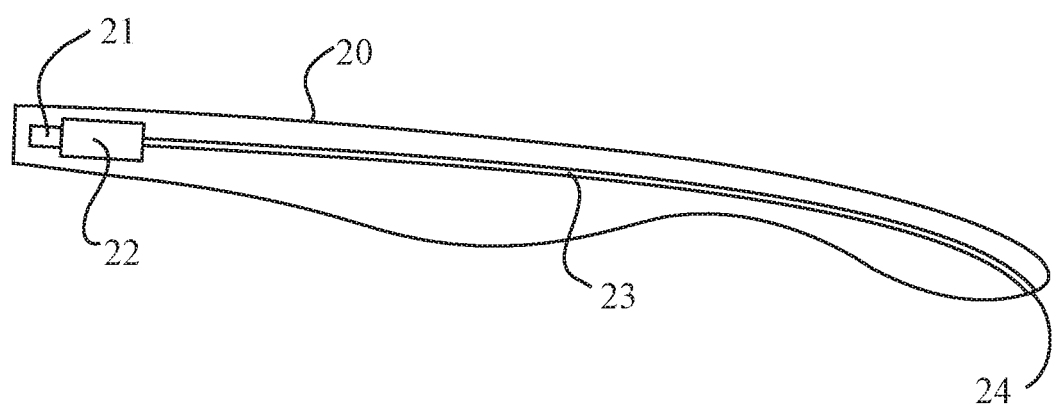
FIG. 9 shows an alternative design using a vaporizer.

An alternative design is shown in FIG. 9. This design uses a vaporizer to light the smoking material rather than a flame. The function and operation of vaporizers is well known in the art. U.S. Pat. Nos. 5,564,442, 7,997,280, and 8,550,068 each describe vaporizer technology that can be used in the present invention, and the specification of each of said U.S. Patents is incorporated herein by this reference as though set forth in full. In FIG. 9 there is a temple 20 that is shown in cross-section. There is an opening 21 in which to insert smoking material. Said opening is operatively connected to a vaporizer 22. The vaporizer then ignites the smoking material and passes smoke down a narrow tunnel 23 that is operatively connected thereto. This passes out a smoke hole 24 at the end of the temple.

One of ordinary skill in the art will appreciate that the techniques, structures and methods of the present invention above are exemplary. The present invention can be implemented in various embodiments without deviating from the scope of the invention. For example, different sizes and dimensions of the various components might be used.

We claim:

1. A pair of eyeglasses, said eyeglasses comprising:
a first lens set in a first rim;
a second lens set in a second rim;
a bridge that connects said first rim to said second rim;
a first temple connected to said first rim;
a second temple connected to said second rim, wherein said second temple comprises: an anterior end; a posterior end; an outer sidewall extending from said anterior end to said posterior end, said outer sidewall having a surface; and, a smoke pathway, said smoke pathway comprising: a bowl formed within said second temple, said bowl comprising a bowl opening formed entirely in said surface of said outer sidewall; a smoke opening formed within said posterior end; and a hollow tunnel formed within said second temple connecting said bowl to said smoke opening, wherein said smoke pathway has no openings other than said bowl opening and said smoke opening and said eyeglasses further comprising: a metal screen that fits within said bowl.

* * * * *